(12) United States Patent
Tollhurst

(10) Patent No.: US 7,416,203 B2
(45) Date of Patent: Aug. 26, 2008

(54) ASSEMBLY FOR CONVERTING STANDARD BICYCLE INTO A RECUMBENT AND A BICYCLE INCORPORATING THE ASSEMBLY

(76) Inventor: John Irven Tollhurst, 2A Brisbane Terrace, Perth, Western Australia (AU) 6000

( * ) Notice: Subject to any disclaimer, the term of this patent is extended or adjusted under 35 U.S.C. 154(b) by 113 days.

(21) Appl. No.: 11/394,547

(22) Filed: Mar. 31, 2006

(65) Prior Publication Data
US 2006/0226630 A1    Oct. 12, 2006

(30) Foreign Application Priority Data
Apr. 12, 2005   (AT)  ............... 2005901804

(51) Int. Cl.
*B62M 1/02*    (2006.01)
(52) U.S. Cl. ............ 280/259; 280/274; 280/281.1
(58) Field of Classification Search ......... 280/288.1, 280/259, 274, 281.1, 249, 250
See application file for complete search history.

(56) References Cited

U.S. PATENT DOCUMENTS

| | | | | |
|---|---|---|---|---|
| 2,482,472 | A * | 6/1949 | Fried | 280/261 |
| 3,848,891 | A * | 11/1974 | Vittori | 280/250 |
| 4,147,370 | A * | 4/1979 | Lindsey, Jr. | 280/234 |
| 4,248,448 | A * | 2/1981 | Dmitrowsky | 280/261 |
| 4,432,561 | A * | 2/1984 | Feikema et al. | 280/282 |
| 4,456,277 | A * | 6/1984 | Carpenter | 280/282 |
| D277,744 | S | 2/1985 | Traylor | |
| 4,838,568 | A * | 6/1989 | Arroyo | 280/234 |
| 5,568,935 | A * | 10/1996 | Mason | 280/282 |
| 5,816,598 | A * | 10/1998 | Dodakian | 280/234 |
| 5,853,184 | A * | 12/1998 | Lofgren et al. | 280/242.1 |
| 5,979,924 | A * | 11/1999 | D'Aluisio et al. | 280/261 |
| 6,189,908 | B1 * | 2/2001 | Lu | 280/284 |

* cited by examiner

*Primary Examiner*—Lesley D. Morris
*Assistant Examiner*—Maurice Williams
(74) *Attorney, Agent, or Firm*—Leyendecker and Lemire, LLC; Kurt Leyendecker (57) ABSTRACT

Embodiments of the present invention comprise assemblies for converting an upright-style bicycle into a recumbent bicycle. Additionally embodiments comprising the converted bicycle are also described.

20 Claims, 7 Drawing Sheets

ASSEMBLY FOR CONVERTING STANDARD BICYCLE INTO A RECUMBENT AND A BICYCLE INCORPORATING THE ASSEMBLY

RELATED APPLICATIONS

This application claims priority to Australian provisional applications Nos. 2005901804 filed on Apr. 12, 2005. The Australian provisional application has the same inventor as this application. The Australian provisional application is incorporated herein in its entirety by reference.

FIELD OF THE INVENTION

The present invention relates generally to bicycles.

BACKGROUND

The huge majority of bicycles sold and available in the marketplace today are of the diamond frame type or derivatives that maintain the substantially upright riding position. Recumbent bicycles which place a rider in a supine orientation have been available for years but despite offering many advantages to diamond frame type bicycles (such as but not limited to more comfortable riding position, and lower wind resistance) have been unable to capture a substantial portion of the bicycle market.

One of the potential reasons for the relative failure of recumbent style bicycles compared to traditional bicycles has been their much greater cost. The huge numbers of diamond frame and derivative bicycles produced permit manufacturers of the bicycles and associated components to take full advantage of manufacturing economies of scale. In contrast, the relatively low demand for recumbents drives up the cost of recumbent components such as the frame, the wheels, and the seat.

In 2004, the inventor of the present invention was awarded an innovation patent No. 2004100489 ('489) from the Australian Patent Office for a "Bicycle Front Wheel Drive Assembly and Adjustable Rear Dropouts". The patent describes an assembly that can be used in conjunction with a standard diamond frame or a derivative frame bicycle to create a recumbent bicycle. Since most of the components of the bicycle are used save for the seat, the total cost of converting a traditional bicycle to a recumbent with the assembly and an associated recumbent seat is substantially less than purchasing a recumbent bicycle.

The original design, although functional, has several drawbacks. First, in '489 design, the front wheel is attached at an intermediate location along the forward chainstays. Because of the relatively small diameter of the forward chainstays as necessitated by the design, the material in the stays can be subject to significant stress and strain potentially subjecting the chainstays to premature failure, usually bending. The intermediate location of the wheel attachment also increases the amount of flex of the chainstays when subject to ground loads. The flexure can be disconcerting to a rider as well as have deleterious effects on the bicycle's stability.

The location of the relocated front drive wheel in the forward chainstays also increases the difficulty in adjusting an associated bicycle for riders with different length legs. Specifically, when the assembly's telescoping tube is lengthened or shortened to accommodate differing leg lengths, the forward chainstays necessarily rotate about the connection locations with the front fork, causing the forward section of the bicycle frame relative to the wheel to be lowered or heightened respectively. It is desirable to have the axles of the respective front and rear wheels approximately equidistant from the ground but any height adjustment would throw off such a balance requiring the use of a pair of rear wheel height adjustment brackets to permit a user to adjust the rear wheel's axle height after the front wheel's height has been changed. Further, the relative change in positioning of the front wheel due to a leg length adjustment may require adjustment of the front brake pads. Needless to say, the recumbent bicycle of the '489 patent is not friendly to rapid adjustment for riders of differing statures and is best set up for a single rider.

Another drawback of the '489 design concerns the connection of the telescoping tube and the associated gooseneck tube to the head tube of the associated bicycle frame. Simply, because the mounting bracket, to which the telescoping tube is pivotally coupled with the gooseneck, is fixedly secured to the gooseneck, the angle of the telescoping tube must change its relative angular orientation as the telescoping tube is lengthened or shortened. Since the front derailleur is attached to the telescoping tube, any angle change of the telescoping tube may require adjustment of the front derailleur's location and/or angular adjustment of the front derailleur's cage.

DETAILED DESCRIPTION

Embodiments of the present invention comprise an assembly and an associated method for converting a standard upright-style bicycle into a recumbent bicycle is described. Further, a recumbent bicycle utilizing the assembly is described in another embodiment.

In at least one embodiment, a pair of front drive wheel mounting brackets are provided that securely and fixedly attach to the end of a bicycle's front fork. Each bracket is further pivotally coupled to a proximal end of a respective front chainstay tube. The front drive wheel's axle is attached to the brackets, and accordingly, the wheels position does not vary when the telescoping tube is lengthened or shortened to adjust the bicycle for users having different leg lengths. Also advantageously, ground loading is transferred primarily to the front fork with the brackets' pivotal connections with the front chainstays isolating the front chainstays that often have a relatively small diameter.

In one variation of at least one preferred embodiment, the telescoping tube is slidably coupled to a gooseneck tube. Accordingly, the relative angle of the telescoping tube can be maintained when the length of the telescoping tube is changed by moving the associated mounting bracket upwardly or downwardly on the gooseneck tube. Advantageously, a user can adjust this embodiment the assembly for people of differing leg lengths and not have to make adjustments to the front derailleur as often as would be required in the prior art.

In at least some embodiments of the present invention, the openings in the drive wheel mounting brackets that receive the axle of the drive wheel therein are elongated slots that rearwardly and slightly upwardly from their open ends towards the fork blades. In other words movement of the axle within the slot adjusts both the wheelbase of the resulting bike, and more importantly, the steering trail. Steering trail affects the stability of the bike with more trail increasing stability of the bicycle and less trail increasing the relative quickness of the steering. By being able to make adjustments to the trail, even if small as in the case in certain variations, a user is able to adjust the steering to his/her personal preference.

Another advantage of embodiments having an elongated slot is that the positions of the respective left and right sides of the axles in their respective slots can be adjusted to center the wheel properly between the front chainstays and the fork blades. As can be appreciated, if the drive wheel mounting brackets are misaligned even slightly and no means for axle end adjustment is provided, the bicycle may not track properly.

In at least one embodiment, a new fork is included as part of the conversion assembly instead of utilizing the fork provided with the standard bicycle that is to be converted. By replacing the entire fork with one that has appropriate spacing for a drive wheel, a pair of mounting brackets that attach to the fork dropouts are no longer required. Rather, the dropouts of the new fork include not only slots for the front drive wheel's axle but openings for pivotally connecting the proximal end of the front chainstays to the fork. Another advantage of this embodiment is that the gooseneck tube can be dispensed. Simply, the fork includes an extra long steering tube that extends through the head tube and its associated headset of the bicycle frame. A slidable mounting bracket is used for pivotally attaching the proximal end of the telescoping tube to the upper portion of the steering tube. By eliminating the gooseneck tube and more importantly the mechanical connection between the gooseneck and the steering tube, the overall strength and integrity of the assembly is improved.

The various embodiments and variations thereof illustrated in the accompanying Figures and/or described herein are merely exemplary and are not meant to limit the scope of the invention. It is to be appreciated that numerous variations of the invention have been contemplated as would be obvious to one of ordinary skill in the art with the benefit of this disclosure. Rather, the scope and breadth afforded this document should only be limited by the claims provided herein while applying either the plain meaning to each of the terms and phrases in the claims or the meaning clearly and unambiguously provided in this specification.

Terminology

The terms and phrases as indicated in parenthesis (" ") in this section are intended to have the meaning ascribed to them in this section applied to them throughout this document including the claims unless clearly indicated otherwise in context.

The term "or" as used in this specification and the appended claims is not meant to be exclusive rather the term is inclusive meaning "either or both".

References in the specification to "one embodiment", "an embodiment", "a preferred embodiment", "an alternative embodiment", "embodiments", "variations", "a variation" and similar phrases means that a particular feature, structure, or characteristic described in connection with the embodiment(s) or variation(s) is included in at least an embodiment or variation of the invention. The appearances of the phrase "in one embodiment" or "in one variation" in various places in the specification are not necessarily all referring to the same embodiment or variation.

The term "couple" or "coupled" as used in this specification and the appended claims refers to either an indirect or direct connection between the identified elements, components or objects. Often the manner of the coupling will be related specifically to the manner in which the two coupled elements interact.

The phrases "upright-style bicycle" and "upright-style bicycle frame" refer to bicycles and frames respectively wherein the rider typically sits upright on a small seat/saddle typically leaning forwardly bracing his/her arm/hands against a pair of handlebars. The "upright-style bicycle" is the most common and well known type of bicycle and accordingly the phrase as used herein does not deviate from its commonly held meaning. In contrast, a "recumbent bicycle" is one in which the rider leans generally rearwardly in a supine position and the seat typically includes a back rest for support.

Figure 1:
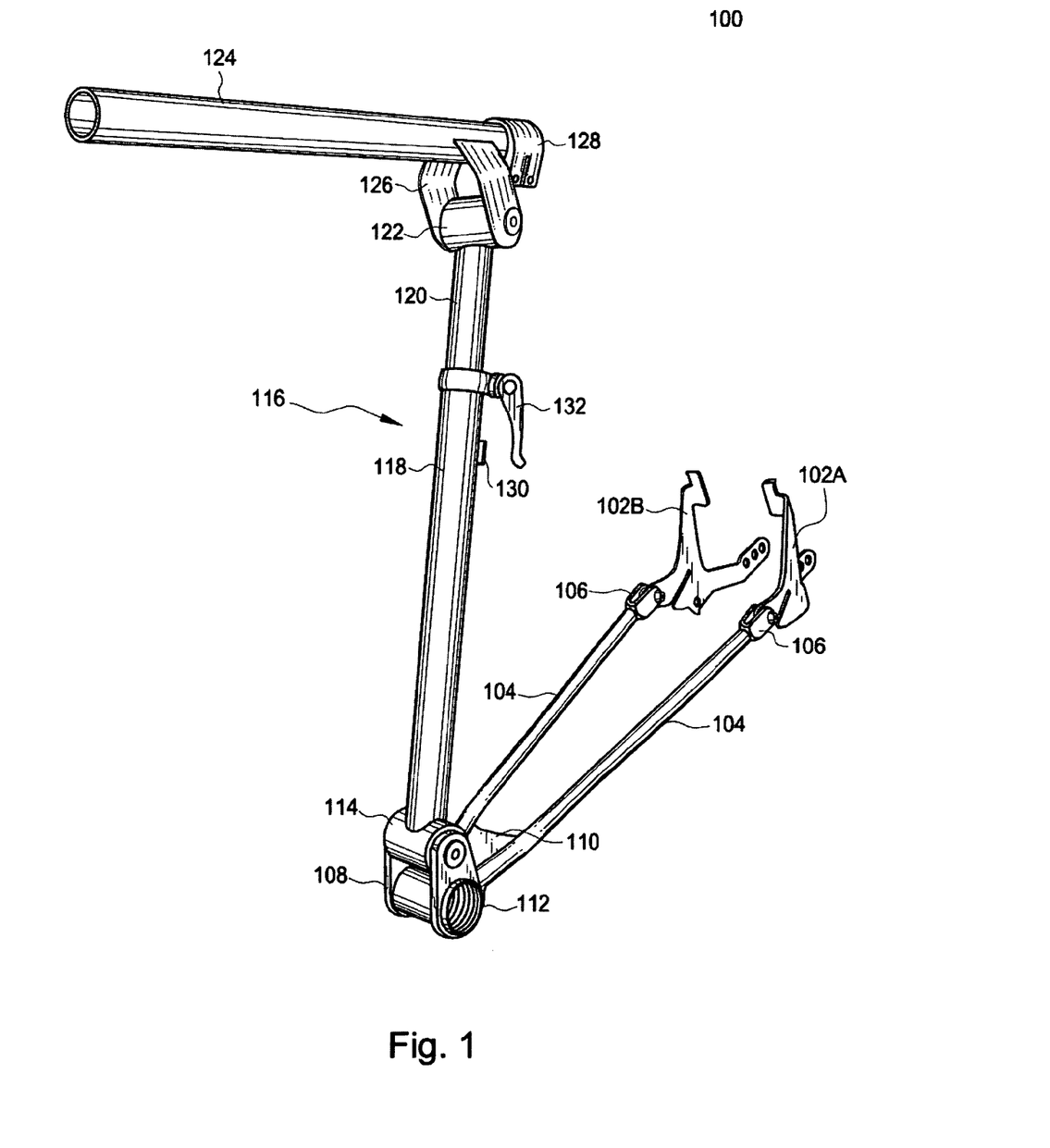
FIG. 1 is an isometric view of an assembly for transforming an upright-style bicycle to a recumbent bicycle according to one embodiment of the present invention.
Figure 3:
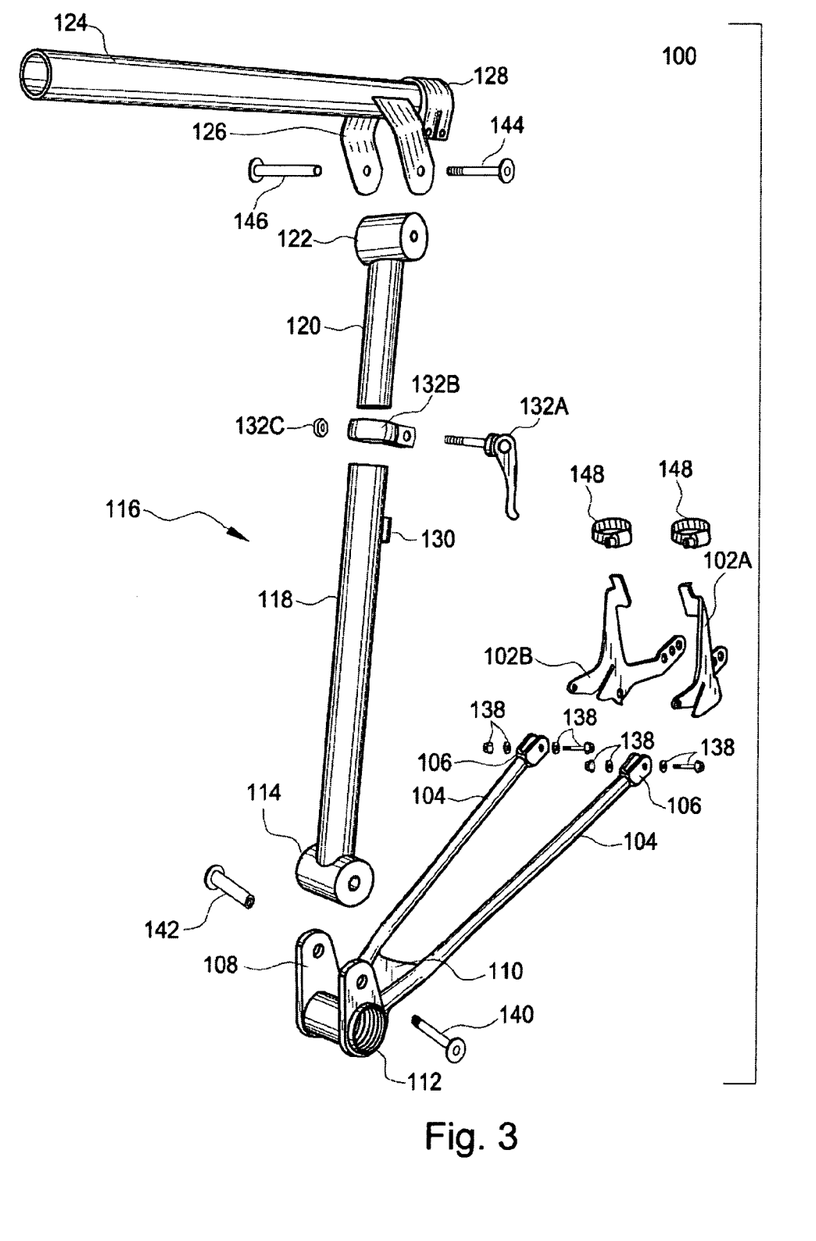
FIG. 3 is an isometric exploded view of the assembly embodiment of FIG. 1.
Figure 6:
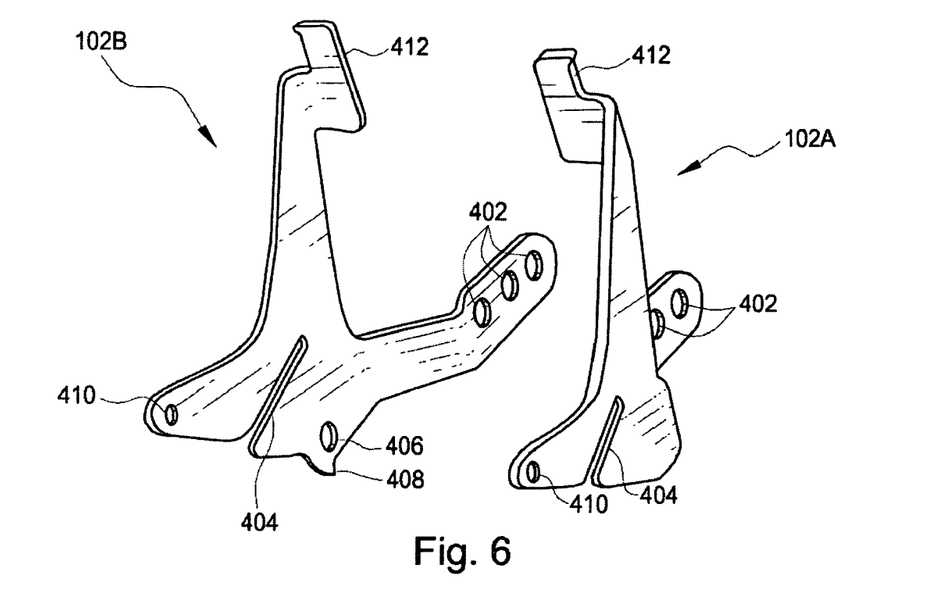
FIG. 6 is an isometric illustration of two mounting brackets as used in embodiments of the present invention.

A First Embodiment Assembly for Converting an Upright-Style Bicycle to a Recumbent Bicycle A first embodiment conversion assembly and the associated parts and components thereof are illustrated in FIGS. 1, 3 & 6.

The distance between front fork dropouts on a traditional upright-style bicycle is about 100 mm to 120 mm to accommodate a front hub of a front bicycle wheel. This distance is not great enough to receive a rear drive wheel having one or more cogs coupled to one side of the rear hub therein. In most multi-speed bicycles the spacing required between rear dropouts to receive a rear wheel is at least 126 mm and more often 130 mm or more. Accordingly, it is not possible to simply swap the rear bicycle wheel with the front bicycle wheel securing rear wheel in the front fork dropouts and the front wheel in the rear fork dropouts to facilitate a recumbent conversion. Rather, a pair of drive wheel mounting brackets 102A&B are required that provide left and right axle openings 404 (see FIG. 6) that are spaced the proper distance from each other.

Figure 5:
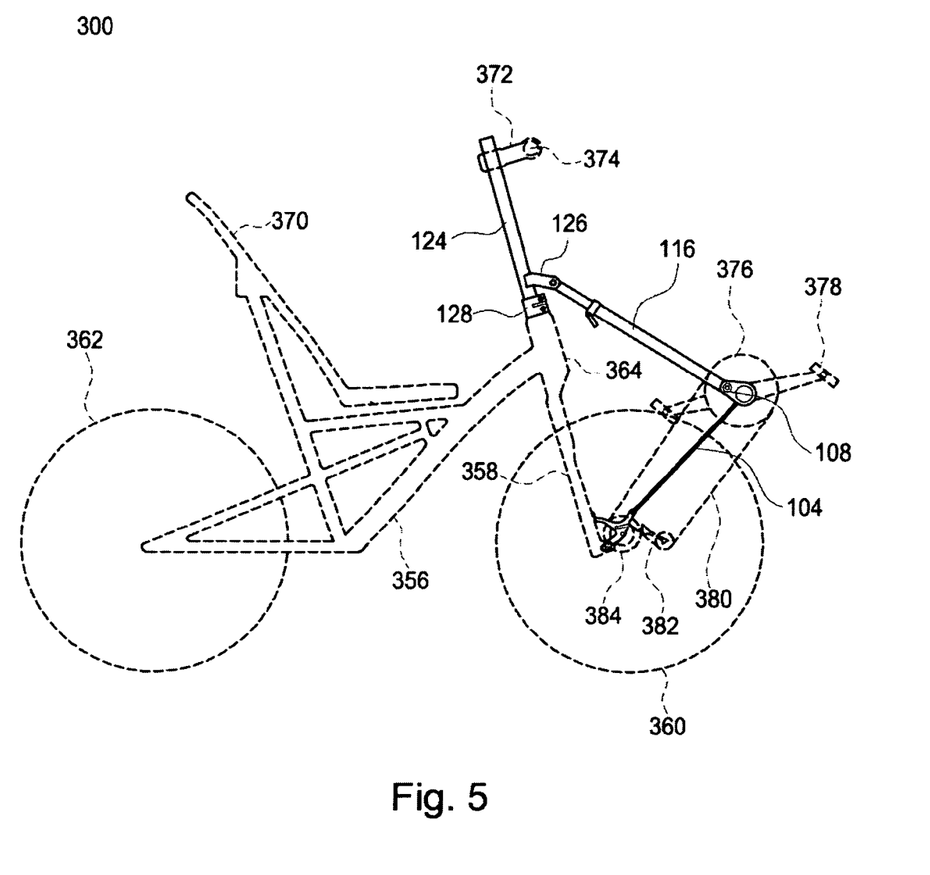
FIG. 5 is a side view of an assembly attached to an upright-style bicycle (shown in phantom) according to yet another embodiment of the present invention.

The respective left and right brackets 102A&B are typically adapted for fixation to the respective left and right blades and/or the left and right dropouts of the front fork 358 as best shown in FIG. 5. The fork is illustrated in its normal forward facing position (i.e. the same position as when it is used on an unmodified upright bicycle). It is appreciated that in some embodiments, the fork will be rotated 180 degrees before connecting the left and right brackets. A series of three dropout bores 402 are provided to receive a threaded bolt through one of the openings to secure the bracket to the associated fork dropout. In variations, the bores can be threaded or in other variations a nut can be used to receive the threaded end of the associated threaded bolt. Typically, the brackets are secured to the inside surfaces of the respective fork blades but in variations the brackets can be secured to the outside surfaces as well. In some instances, spacers (not illustrated) may be placed between the fork dropout and the bracket 102 to ensure proper alignment of the fork blades, the brackets 102 and the front chainstays 104. The multiple bores 402 permit the user to choose the bore that is most suitable relative to the associated fork such that the generally perpendicular flange 412 of each bracket 102 rests on or close to and is generally parallel to the associated fork blade.

From the portion of each bracket 102 that includes the bores 402, the bracket extends forwardly and flares outwardly to a planar portion that includes openings for receiving the ends of the drive wheel axles therein. In the illustrated bracket of FIG. 6, the openings comprise elongated slots 404 that extending generally rearwardy and slightly upwardly. In variations the openings can comprise slots or holes that have a length, width and/or diameter similar to or slightly greater than the diameter of the associate drive wheel axles. However, as described above, elongated slots having a length approximately 4-10 times the length of the axle's diameter, the user can adjust the trail and wheelbase of the bicycle.

The planar portion typically extends upwardly relative to the elongated slot 404 terminating at a bend that intersects with the perpendicular flange 412. As the name suggests, the perpendicular flange is generally perpendicular to the planar portion of the bracket 102. Each flange is adapted to receive a clamp 148, such as an endless band clamp 148 shown in FIG. 3, around it and around the associated fork blade, thereby further secure the bracket to the fork and preventing pivotal movement of the bracket relative its coupling to the corresponding fork dropout.

Forward of the elongated slot 404 on the planar portion of the bracket 102, a front bore 410 through which a bolt is received pivotally secure the proximal end 106 of an associated front chainstay to the bracket.

The bracket 102B on the left as viewed in FIG. 6 (the bracket would be on the right side relative to a rider on a converted recumbent bicycle) further includes a threaded derailleur bore 406 and an associated derailleur stop 408 for mounting a typical rear derailleur thereto. Although a derailleur is typically located on the right side of a rear (or drive wheel) hub as required with most commercially available rear hubs and rear derailleurs, variations of the brackets are contemplated wherein the derailleur could be located on the left side of a bicycle with an appropriately modified derailleur and drive hub.

The drive wheel mounting brackets 102 can be comprised of any suitable materials including steel, aluminum, titanium or a composite material. In one embodiment, the bracket is made of plate steel that is either stamped or machined to the desired configuration and then bent to form the perpendicular flange and the transition between the planar portion and the portion including the dropout bores 402.

Referring primarily to FIGS. 1 and 3, the proximal ends 106 left and right front chainstays 104 are pivotally coupled to the drive wheel mounting brackets 102 at their associated front bores 410 by way associated threaded fasteners, washers and nuts 138. The front chainstays typically comprise small diameter tubing of steel, aluminum, titanium or composite material, but in variations the stays can comprise other material or forms. For example, stays having C-shaped or I-beam shaped cross sections are contemplated.

As illustrated herein, the proximal ends 106 comprise C-shaped flange members that receive the bracket plate 102 proximate the front bore 410 therein and have corresponding bores to receive the threaded fastener assemblies 138 therethrough. As illustrated, the C-shaped flange members are welded to the chainstay tubes 104; however in variations the flange members can be differently shaped and can attach to the chainstays by other means including but not limited to adhesive bonding, brazing, welding and mechanical fastening. It is further appreciated that bearing assemblies, bushings, and washers can be utilized in variations to minimize pivotal friction.

The stays typically taper inwardly at a slight acute angle relative to a longitudinal center plane of the assembly and terminate at a distal end that is coupled with a crankshaft bearing shell assembly 108. Typically, the distal ends of the stays are coupled to the shell by way of welding, adhesive bonding, brazing and/or mechanical fastening. A gusset 110 is also shown to provide additional strength to the stays 104 particularly at their location of coupling to the bearing shell assembly 108. In other variations, the gusset may be omitted, or in yet other variations, a cross bracing tube or other equivalent structure can be utilized to strengthen the stays proximate the bearing shell.

The bearing shell assembly 108 is typically comprised of steel or another suitable metallic material and includes a bottom bracket bore 112 extending generally in a direction roughly perpendicular to the front chainstays 104 and substantially parallel to the drive wheel axle when the drive wheel is received in the drive wheel mounting brackets 102. The bore is threaded on either side and adapted to receive a standard crankset bottom bracket assembly comprising bearings and a bottom bracket axle.

As illustrated, the shell assembly 108 includes two flanges that are located at the proximate ends of the shell and extend upwardly from the location of the bottom bracket bore 1112 at approximately a 60-120 degree angle relative to the front chainstays 104. The space between the inside surfaces of the flanges defines a recess into which a lower bearing shell 114 is received to pivotally couple a bottom tube 118 of the telescoping tube assembly 116 thereto by way of a pair of mating fasteners 140&142 that are received through aligned openings proximate the distal ends of the pair of flanges.

In at least one variation of the first embodiment, the telescoping tube assembly 116 can fixedly secured to the bottom bracket shell assembly 108, such as by welding, and the front chainstays 104 can be pivotally coupled to the bottom bracket shell. Generally, one pivotal connection at the bottom bracket shell assembly is desirable to permit length adjustment of the telescoping tube assembly 116 to accommodate riders of differing leg lengths.

It is appreciated, however, that variations wherein both a top tube (replacing the telescoping tube assembly) and the front chainstays 104 are fixedly secured to bottom bracket shell assembly 108 are contemplated forming a fixed angle therebetween. By having both the chainstays and the top tube (or elongated bracing member as referenced in one or more claims) fixed to the bottom bracket shell assembly, essentially no or minimal adjustment for differing leg lengths is possible for such a first embodiment variation, and accordingly, such a variation would likely be constructed specifically for people with a particular leg length.

Figure 2:
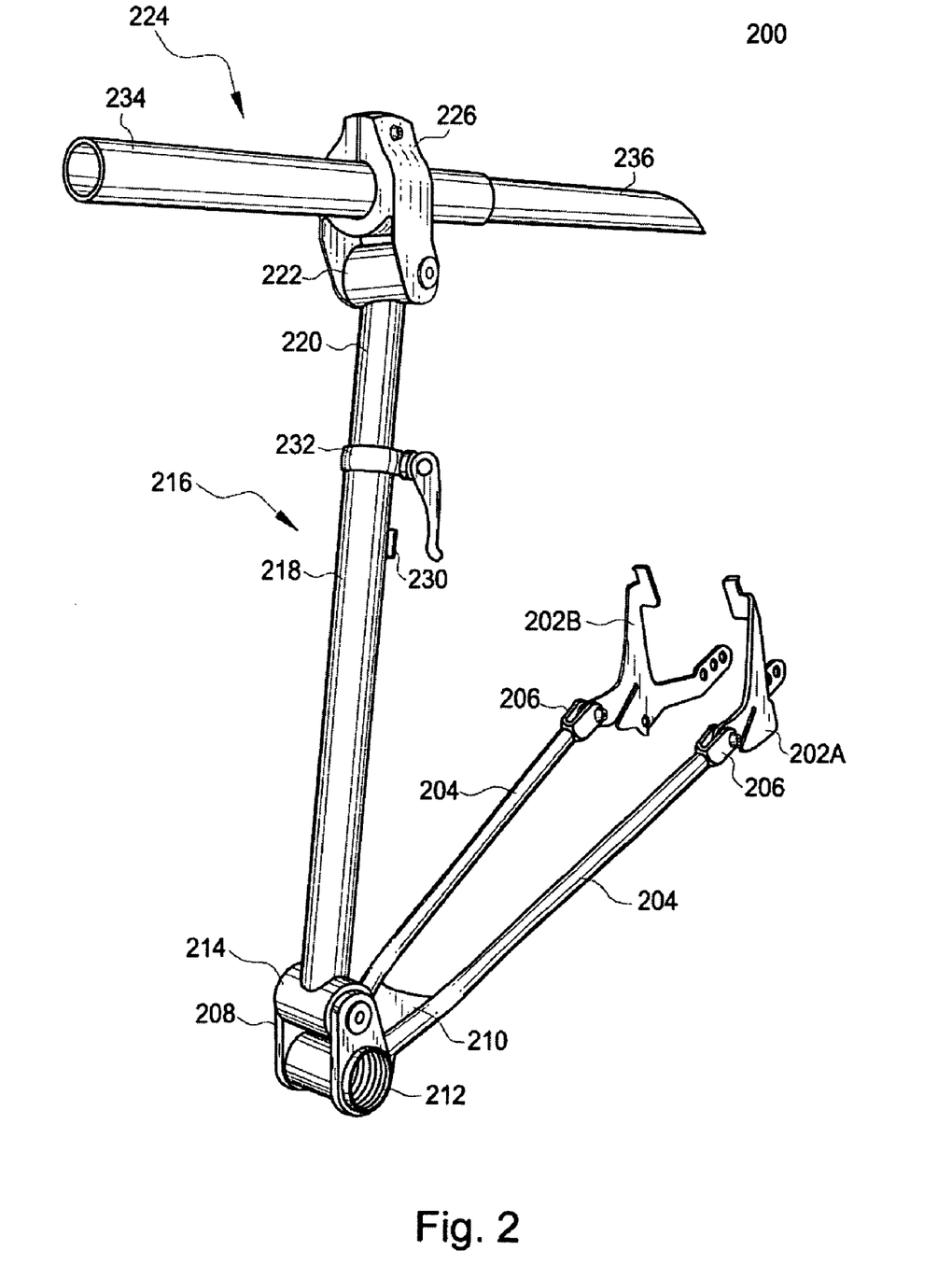
FIG. 2 is an isometric view of an assembly for transforming an upright-style bicycle to a recumbent bicycle according to another embodiment of the present invention.
Figure 4:
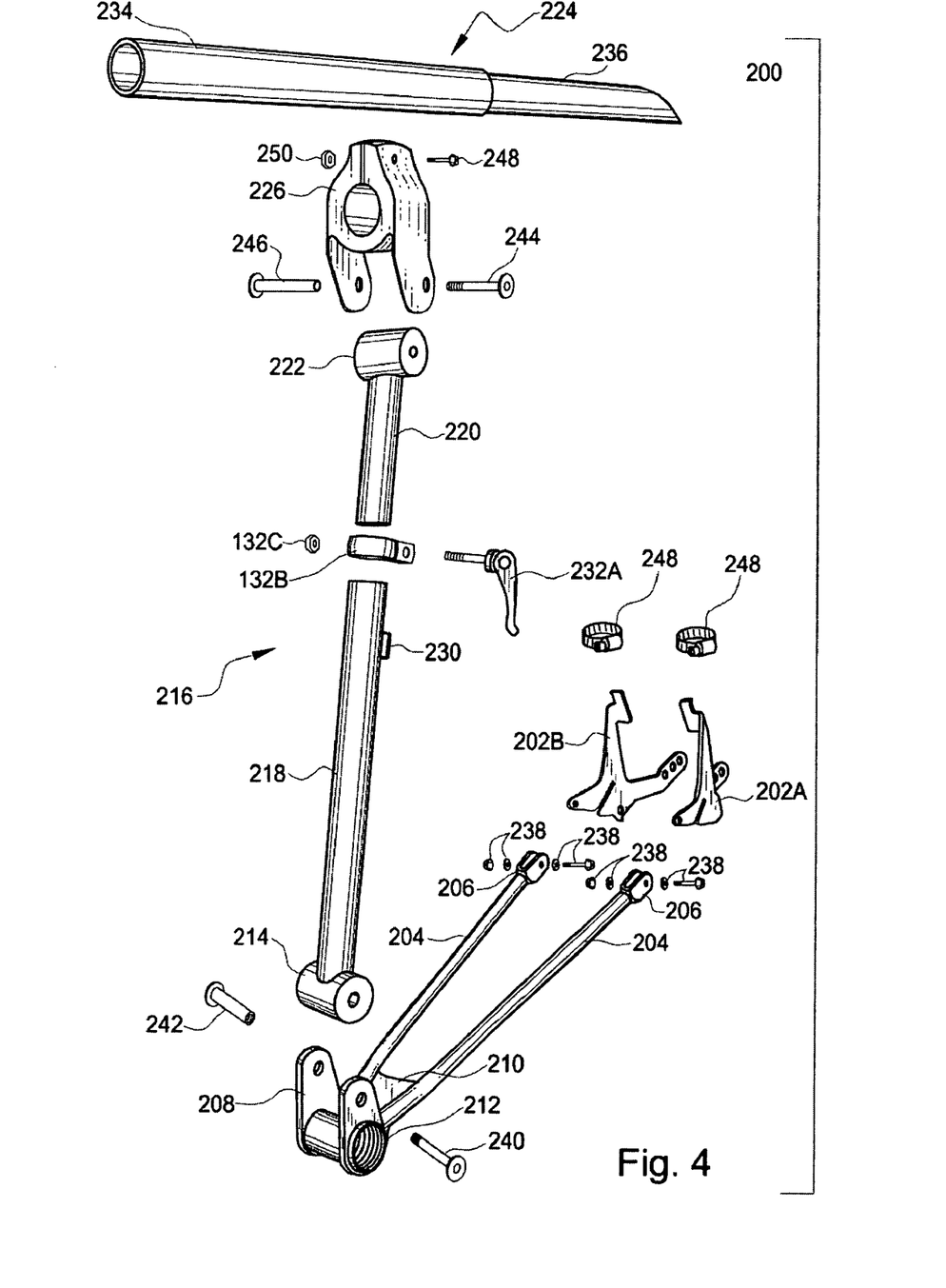
FIG. 4 is an isometric exploded view of the assembly embodiment of FIG. 2.

In contrast, even if the chainstays 104 and the bottom tube 118 of the telescoping tube assembly 116 are fixed to the bottom bracket shell 108 in the second embodiment shown in FIGS. 2 & 4 (discussed in greater detail below), some adjustment in telescoping tube length will be possible because the mounting collar 226 to the gooseneck tube 234 used in that embodiment is permitted to slide upwardly and downwardly along the gooseneck tube.

Again referring primarily to FIGS. 1 & 3, the telescoping tube assembly 116 comprises: (i) the bottom tube 118 that terminates on the bottom end in the aforementioned lower bearing shell 1.14; (ii) a top tube 120 that terminates at a top end at an upper bearing shell 122; (iii) associated bearing assemblies (not shown) contained within the bearing shells; (iv) a clamp assembly including a collar clamp 132B, a quick release bolt 132A and an associated threaded nut 132C. Further, in some variations, a cable stop 130 for a housing of a front derailleur cable may be provided.

The top and bottom tubes 120 & 118 are configured to nest one snuggle inside the other such that the tubes can be slid together or apart to adjust the length of the telescoping tube assembly 116. As shown, the outside diameter of the top tube is slightly smaller than the inside diameter of the bottom tube although in variations the relative diameters can be reversed. The collar clamp 132B of the collar assembly is fitted over the end of the larger tube and is tightened around the tubes end by way of the quick release bolt 132B and associated nut 132C to effectively lock and fix the smaller tube in place at a desired length.

The top and bottom tubes can be comprised of a metallic or composite material and the bearing shells 114 & 122 can be welded, brazed, adhesively bonded or mechanically secured to the tubes. In other variations, the tubes can be replaced with suitable elongated members that can comprise any suitable shape and configuration, such an I-beams or nested C-Channels.

The top tube 120 is pivotally connected to a gooseneck tube 124 by way of the upper bearing shell 122, a bearing/bushing assembly (not shown) contained in the shell and a pair of elongated mating fasteners 144 & 146 received in-between a pair of spaced gooseneck flanges 126 fixedly attached to the gooseneck tube 124.

The gooseneck tube 124 of the first embodiment 100 is adapted primarily for use with an Ahead-style headset and stem. The steering tube of an Ahead-style fork extends 1-2 inches above the top of the bicycle's headset typically for receiving the Ahead-style stem thereon. The gooseneck tube has an inside diameter only slightly greater than the outside diameter of the exposed portion of the steering tube such that it fits snuggly thereover. A collar clamp 128 is provided proximate the bottom end of the gooseneck tube to secure the tube in place over the steering tube. In use, an Ahead-style stem or a more traditional quill style stem can be secured to the top end of the gooseneck tube. The gooseneck tube is typically made of steel, aluminum, titanium or a composite. Although illustrated as comprising a tube, goosenecks having other configurations are also contemplated.

A Second Embodiment Assembly for Converting an Upright-Style Bicycle to a Recumbent Bicycle A second embodiment conversion assembly and the associated parts and components thereof are illustrated in FIGS. 2, 4, 6 & 7. Generally, the second embodiment assembly is substantially similar to the first embodiment assembly save for the gooseneck tube 224 and the gooseneck mounting collar 226, which replaces the gooseneck flanges 126 of the first embodiment.

Unless specifically indicated herein, the elements identified in the figures of the second embodiment are substantially similar to the elements identified in the first embodiment if they share the same number in the last two digits of the associated element identifier. Accordingly, second embodiment elements and components that are substantially similar to elements and components in the first embodiment are intended to perform and operate in substantially the same manner as described in the first embodiment.

Figure 7:
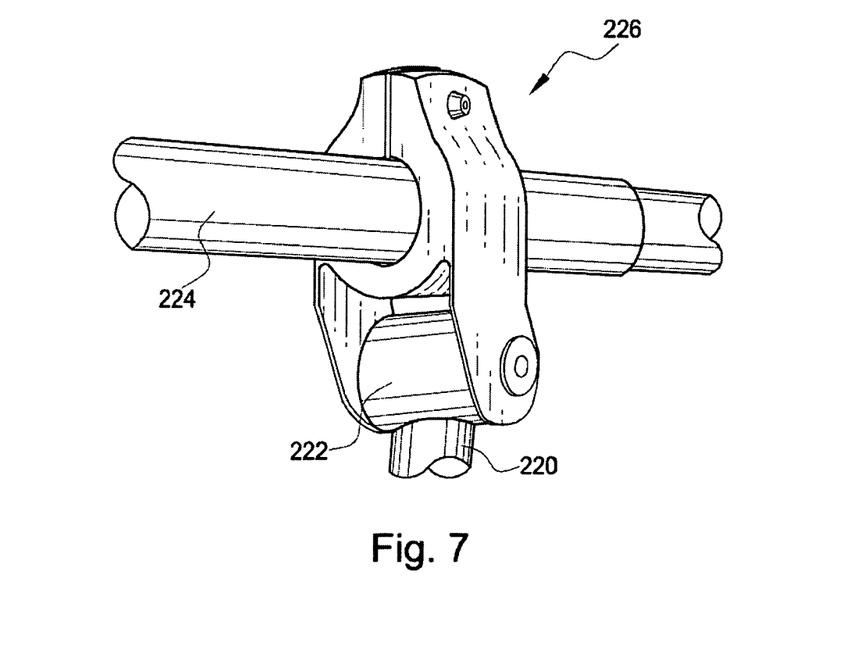
FIG. 7 is an isometric illustration of a gooseneck clamp as used in embodiments of the present invention.

Referring to FIG. 7, the gooseneck mounting collar 226 is best illustrated. It is pivotally coupled to the upper bearing sleeve in substantially the same manner that the gooseneck flanges 126 of the first embodiment mount to the first embodiment upper bearing sleeve 222. However, the mounting collar is adapted to be clamped to an upper portion 234 of the gooseneck tube permitting upwardly and downwardly movement of the collar when the associated clamp fastener is loosened. Advantageously, a user can maintain the relative angle between the front chainstays 204 and the telescoping tube 216 when adjusting the telescoping tubes length for riders having different leg lengths. Accordingly, the relative angle of the front derailleur, which is mounted to the bottom tube 218, and its associated cage (not shown) relative to the crankset can be maintained thereby eliminating the need to adjust the front derailleur and thereby keeping the relative angle within the range that commonly available rear derailleurs are designed for.

The mounting collar 226 is typically comprised of steel or aluminum although other suitable materials can be used. In some variations, a quick release fastener can be used to secure the collar to the gooseneck tube permitting quicker and easier adjustment of the second embodiment assembly 200 for riders of differing leg lengths.

The gooseneck tube 224 comprises the upper portion 234 and a smaller outside diameter lower portion 236. The lower portion, or quill, is sized to be snuggly received into the interior of a steering tube of an associated fork. Accordingly, embodiments utilizing this gooseneck tube can be used with bicycles adapted to have a quill-style headset secured thereto. It is further appreciated that this style gooseneck tube can also be used with A-head style steering tubes.

The gooseneck tube 224 is fixedly secured to a fork steering tube by tightening a wedge nut up against the canted bottom end of the lower portion thereby wedging the gooseneck tube within the steering tube in a fashion substantially similar to the manner in which traditional bicycle stems are secured within a steering tube on an upright style bicycle. The larger diameter upper portion 234 extends upwardly above the steering tube and is adapted to receive either the quill of a quill-type stem into its interior at its top end or an A-head style stem over it outside diameter above the mounting collar 226

It is to be appreciated that while the first embodiment uses one type of gooseneck tube 134 and the second embodiment another type of gooseneck tube 234, several variations and alternative embodiments are contemplated. For instance, a gooseneck tube of the general design of the second embodiment tube 224 is contemplated having fixed gooseneck flanges 126 of the first embodiment. Further, another gooseneck tube of the general design of the first embodiment tube 124 sans the gooseneck flanges 126 designed for use with a second embodiment mounting collar 226 is also contemplated.

Third and Fourth Embodiment Assemblies for Converting an Upright-Style Bicycle to a Recumbent Bicycle Third and Fourth embodiments wherein the conversion assembly includes a fork intended to replace the fork of the upright-style bicycle undergoing a conversion are illustrated in FIGS. 8A-B & 9A-B.

The front chainstays, 504 & 604, the bottom bracket bear shell assembly 508 & 608, the telescoping tube assembly 516 & 616 and the mounting collar 526 & 626 are substantially similar to the corresponding components on the second embodiment and will not be described in any greater detail herein. The third and fourth embodiments differ from the first and second embodiments primarily in that the assembly eliminates the drive wheel mounting brackets 102&202 and the gooseneck tubes 124&224 that are adapted to mount with the upright-style bicycle's fork 358 replacing these components with a fork specifically designed for use with a recumbent conversion of an upright-style bicycle. For these embodiments the fork of the upright-style bicycle is not utilized in the conversion but rather completely replaced.

Both the third and fourth embodiments include fork dropouts 502&602 that include openings and/or bores to receive the drive wheel 360 and its associated drive gear assembly 384 (or freewheel) there between. The fork dropouts further include bores to pivotally mount the front chainstays 504&604 to the dropouts. One dropout may also be configured to facilitate the mounting of a rear derailleur thereto. As shown, additional openings can be provided to facilitate attachment of fenders, disk brakes or other accessories to the fork. Essentially, the dropouts perform a similar function as the mounting brackets 102&202 of the first two embodiments expect the dropouts are an integral part of the fork and not an attachment thereto.

The need for a gooseneck tube is obviated by extending the length of the steering tube above the head tube of the bicycle frame 356 a suitable distance. The mounting collar is simply mounted to the outside of the elongated steering tube at the appropriate location there along. A stem 372, either a quill or an A-head type, is merely mounted to or proximate the top of the elongated steering tube.

Figure 8A:
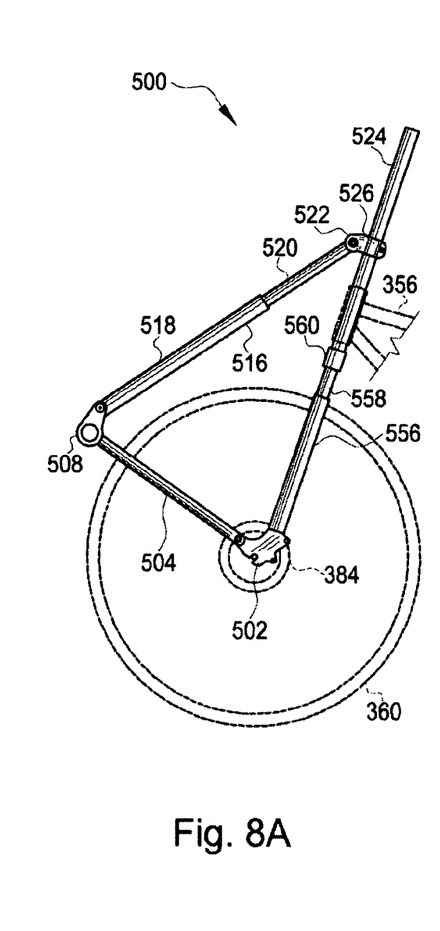
FIGS. 8A & 8B are side views of yet another assembly embodiment wherein the bicycle fork comprises part of the assembly.
Figures 8B, 9A:
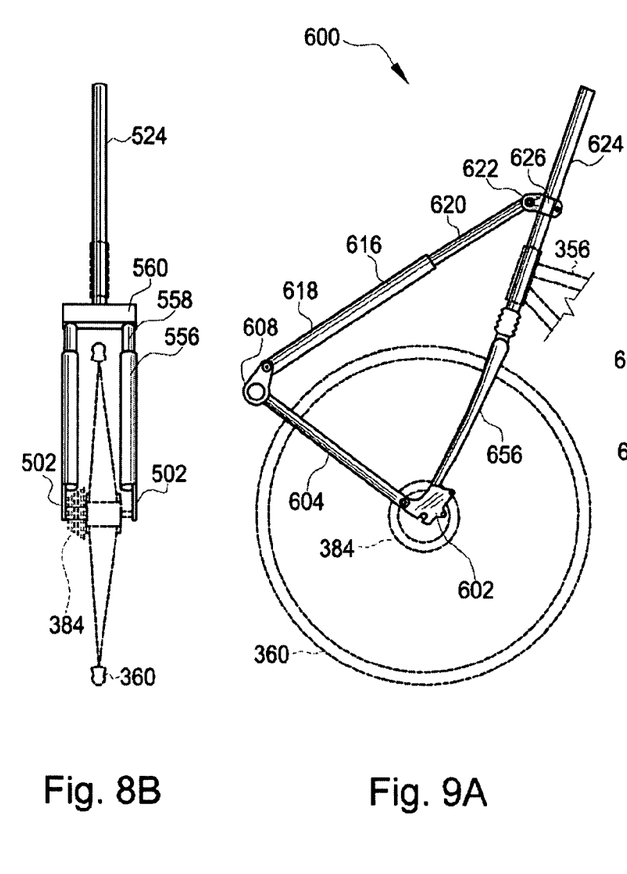
FIGS. 9A & 9B are side views of even yet another assembly embodiment wherein the bicycle fork comprises part of the assembly.

Both the third and fourth embodiments 500&600 are suspension forks although variations that comprise fixed forks are also possible. The third embodiment 500 comprises a crown 560 to which the steering tube 524 is mounted and extends upwardly and two stanchion tubes 558 are mounted and extend downwardly. Slider tubes 556 to which the dropouts 502 are secured slide along and over the stanchion tubes. A spring/dampening mechanism is typically contained with the slider tubes.

Figure 9B:
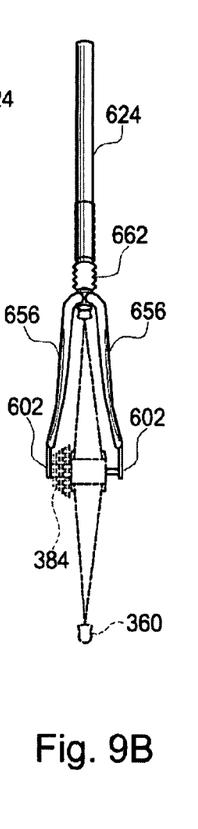

In the fourth embodiment, the spring/dampening mechanism is contained in the steering tube 624 and the associated sliding tube (partially underneath bellows 662) slides upwardly and downwardly within the steering tube. The fork blades 656 are typically welded or otherwise secured to the sliding tube. The dropouts 602 are fixedly attached to the bottom end of the fork blades. Of course, reasonable variations to the forks and their configurations are contemplated as would be obvious to one of ordinary skill in the art given the benefit of this disclosure.

A Recumbent Bicycle Embodiment Utilizing a Conversion Assembly

FIG. 5 is an illustration of an upright-style bicycle 300 that has been converted to a recumbent bicycle using a first embodiment conversion assembly 100. The upright-style bicycle that has been converted is provided primarily in dashed lines, as well as, a recumbent style seat 370 with an associated seat back.

The conversion assembly is as described above having a pair of drive wheel mounting brackets 102 that are fixedly secured to the bicycles fork 358, which is may be rotated 180 degrees relative to its orientation when used with the pre-conversion upright bicycle. The mounting brackets are bolted to the fork at the fork dropouts and attached with band clamps 148 to the fork blades. It is appreciated other means of attaching the mounting brackets are contemplated. For instance, the band clamps can be replaced with other types of clamps as would be obvious to one of ordinary skill in the art with the benefit of this disclosure. An attachment means, such as a threaded boss or opening could be provided to bolt the bracket to the fork in other variations. In yet other variations, the brackets could be welded to the fork blades.

The drive wheel 360 is received into the brackets. As indicated above, the drive wheel typically comprises the rear wheel of the pre-converted bicycle and includes a rear hub with associated cogs (or freewheel) 384. Further, a rear derailleur is attached to one of the brackets, typically the right, to facilitate changing gears while riding.

The front chainstays 104 extend forwardly of the brackets to which they are pivotally attached terminating at the bottom bracket shell assembly 108. A standard bottom bracket bearing assembly is received into the shell and the bear assembly is often, although not necessarily the assembly that has been removed from the bicycle frame's bottom bracket tube. A crankset 376 is attached to the bottom bracket bearing assembly in the traditional manner. Many cranksets have multiple chainrings that can be shifted with a front derailleur. Accordingly, a front derailleur (not shown) may be attached to the telescoping tube assembly 116 to facilitate such shifting.

The telescoping tube is pivotally attached to the bottom bracket shell assembly at one and pivotally attached to the gooseneck tube 124 at the other end. The gooseneck tube is fixedly coupled to the steering tube of the fork 358 and has a stem 372 attached to it proximate its top end. The stem in turn secures a handlebar 374 in place that is used to steer the recumbent bicycle.

Most any upright style bicycle can be utilized for the conversion; however bicycles having Y-frames 356 to traditional double diamond frames are preferred as the seat 370 can be mounted lower. Since the rear drive wheel of the pre-converted bicycle is moved to the front, the front non-drive wheel is moved and mounted in the rear dropouts of the frame 356. Because the width of the front hub is less than the spacing provided between the rear dropouts, the hub's axle may need to be replaced with a longer one and axle spacers may need to be utilized on either end of the hub to span the gaps caused by the relative size differences.

Alternative Embodiments and Other Variations

The various preferred embodiments and variations thereof illustrated in the accompanying figures and/or described above are merely exemplary and are not meant to limit the scope of the invention. It is to be appreciated that numerous variations to the invention have been contemplated as would be obvious to one of ordinary skill in the art given the benefit of this disclosure. All variations of the invention that read upon the appended claims are intended and contemplated to be within the scope of the invention.

I claim:

1. An assembly for converting a bicycle including an upright-style bicycle frame and a front fork into a recumbent bicycle, the assembly comprising:

a pair of brackets adapted to fixedly and removably couple to the front fork, each bracket further including an axle opening adapted to receive an end of an axle of a drive wheel therein;

a pair of front chainstays, each having proximal and distal ends, the proximal end of each front chainstay being pivotally coupled to a bracket of the pair of brackets;

a bottom bracket shell attached to the distal end of each front chainstay, the bottom bracket shell being adapted to receive a crankshaft bearing assembly therein; and an elongated bracing member, the bracing member being pivotally coupled to the bottom bracket shell, the bracing member being adapted to be coupled to a steering tube of the front fork such that the bracing member pivots with the steering tube relative to a head tube of the upright-style bicycle frame.

2. The assembly of claim 1, wherein each bracket of the pair of brackets includes a flange, the flange being adapted to receive a tubular clamp therearound to secure the bracket to a corresponding blade of the front fork.

3. The assembly of claim 1, wherein one bracket of the pair of brackets includes a threaded opening adapted to receive a mounting boss of a bicycle derailleur therein.

4. The assembly of claim 1, wherein the bracing member is adjustable in length.

5. The assembly of claim 4, wherein the bracing member comprises a pair of nested telescoping tubes.

6. The assembly of claim 1 wherein the bracing member is adapted for coupling to the steering tube by way of a gooseneck tube, the bracing member being pivotally coupled to the gooseneck tube by way of a brace bracket, the gooseneck tube being adapted to fixedly couple to the steering tube.

7. The assembly of claim 6, wherein the gooseneck tube includes a quill portion adapted to be (i) received into the interior of the steering tube and (ii) wedged against the interior to secure the gooseneck tube in place.

8. The assembly of claim 6, wherein a first end of the gooseneck tube is adapted to be received over a portion of the steering tube extending above the head tube and further includes a clamp proximate the first end for fixedly securing the gooseneck tube to the steering tube.

9. The assembly of claim 6, wherein the brace bracket is immovably fixed to the gooseneck tube.

10. The assembly of claim 6, wherein the brace bracket is adapted for upwardly and downwardly sliding adjustment prior to being clamped to the gooseneck tube.

11. A recumbent bicycle adapted from an upright-style bicycle, the recumbent bicycle comprising:
   a upright-style bicycle frame including a front fork;
   a drive wheel including one or more gears secured to a hub thereof;
   a non-drive wheel having a hub without any gears associated therewith secured to rear dropouts on the frame;
   a seat including a seatback, the seat at least partially secured to both (a) a top member of the frame and (b) a seat tube of the frame; and
   a conversion assembly including (i) left and right brackets fixedly and removably secured respective left and right blades of the fork and each bracket having an opening with an axle of the drive wheel received therein; (ii) left and right front chainstays pivotally coupled to the respective left and right brackets at proximal ends thereof; (iii) a bottom bracket shell coupled to the distal ends of the left and right front chainstays; (iv) an elongated bracing member having proximal and distal ends, the distal end being coupled to the bottom bracket shell wherein one of the coupling between the bottom bracket shell and the front chainstays and the coupling between the bottom bracket shell and the bracing member is a pivotal coupling; and (v) a gooseneck tube fixedly coupled to a steering tube of the fork for unitary movement therewith; and a clamp pivotally coupled to bracing member and adapted for upwardly and downwardly height adjustment along the gooseneck tube prior to being fixedly clamped in place;
   wherein (1) a stem and handlebar assembly is fixedly secured to the gooseneck tube proximate a distal end thereof, (2) a crankset by way of an associated bottom racket assembly is rotatably coupled to the bottom bracket shell, and (3) a drive chain extends between the crankset and the one or more gears of the drive wheel.

12. The recumbent bicycle of claim 11, further including a rear derailleur coupled to one of the left and right brackets and adapted to move the chain between the two or more gears of the drive wheel.

13. The recumbent bicycle of claim 12, further including a front derailleur coupled to the bracing member wherein the crankset includes at least two chainwheels and the front derailleur is adapted to move the chain from one chainwheel to another.

14. The recumbent bicycle of claim 11, wherein the bracing member comprises a pair of telescoping tubes.

15. The recumbent bicycle of claim 11, wherein the traditional bicycle frame comprises a Y-frame.

16. The recumbent bicycle of claim 11, wherein the front fork is a suspension fork.

17. An assembly for converting a conventional bicycle into a recumbent bicycle, the assembly comprising:
   a front fork having a steering tube, left and fight fork blades terminating in respective left and right dropout brackets, the dropout brackets each including an axle opening adapted to receive an axle therein and the inside edges of the opening being spaced at least 126 mm apart,;
   left and right front chainstays, each having proximal and distal ends, the proximal end of each front chainstay being pivotally coupled to the respective left or right dropout bracket through a connection other than the respective axle opening;
   a bottom bracket shell attached to the distal end of each front chainstay, the bottom bracket shell being adapted to receive a crankshaft bearing assembly therein; and
   an elongated bracing member having adjustable length, the bracing member being pivotally coupled to the bottom bracket shell at a distal end and coupled to the steering tube at the proximal end by way of a tubular clamp, the tubular clamp permitting height adjustment of the proximal end of the bracing member prior to be secured in place.

18. The assembly of claim 17, wherein the front fork comprises a suspension fork.

19. The assembly of claim 17, wherein one of the left and right dropout brackets includes a threaded opening for receiving a rear derailleur boss therein.

20. The assembly of claim 1, wherein the proximal end of each front chainstay is pivotally coupled to a bracket of the pair of brackets at a connection other than through the axle opening.

* * * * *